March 30, 1965  J. M. RHOADES  3,176,282
COMPENSATING CIRCUIT FOR POSITION INDICATING DEVICE
Filed Feb. 14, 1962  2 Sheets-Sheet 1
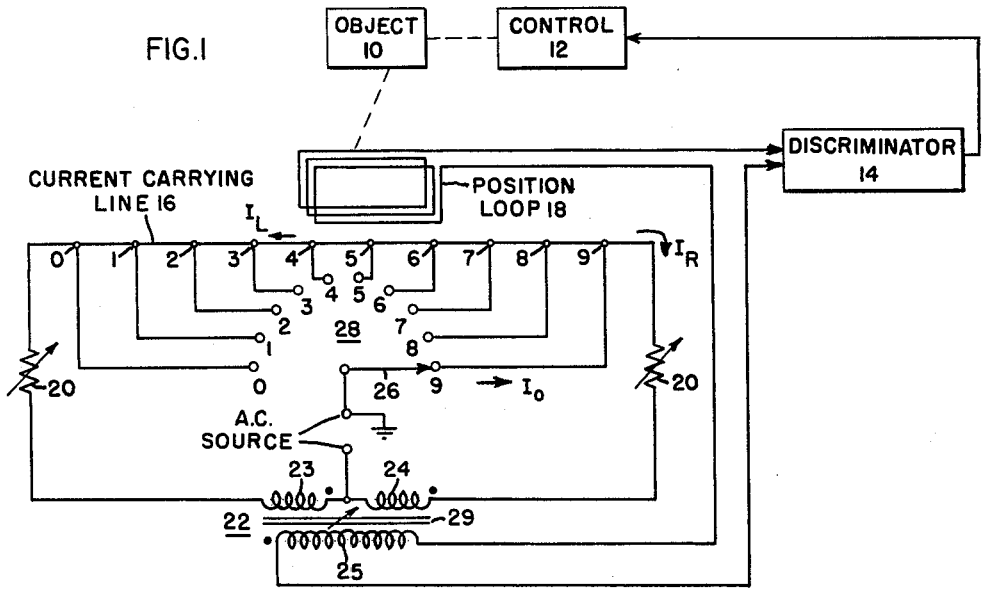
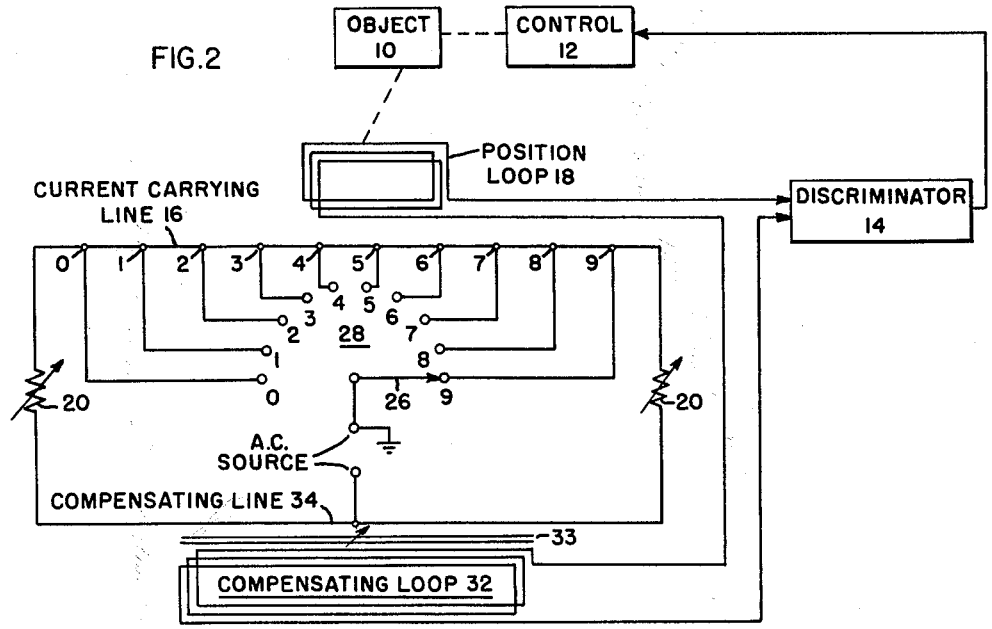
INVENTOR:
JOHN M. RHOADES,
BY james g. Williams
HIS ATTORNEY.

March 30, 1965   J. M. RHOADES   3,176,282
COMPENSATING CIRCUIT FOR POSITION INDICATING DEVICE
Filed Feb. 14, 1962   2 Sheets-Sheet 2
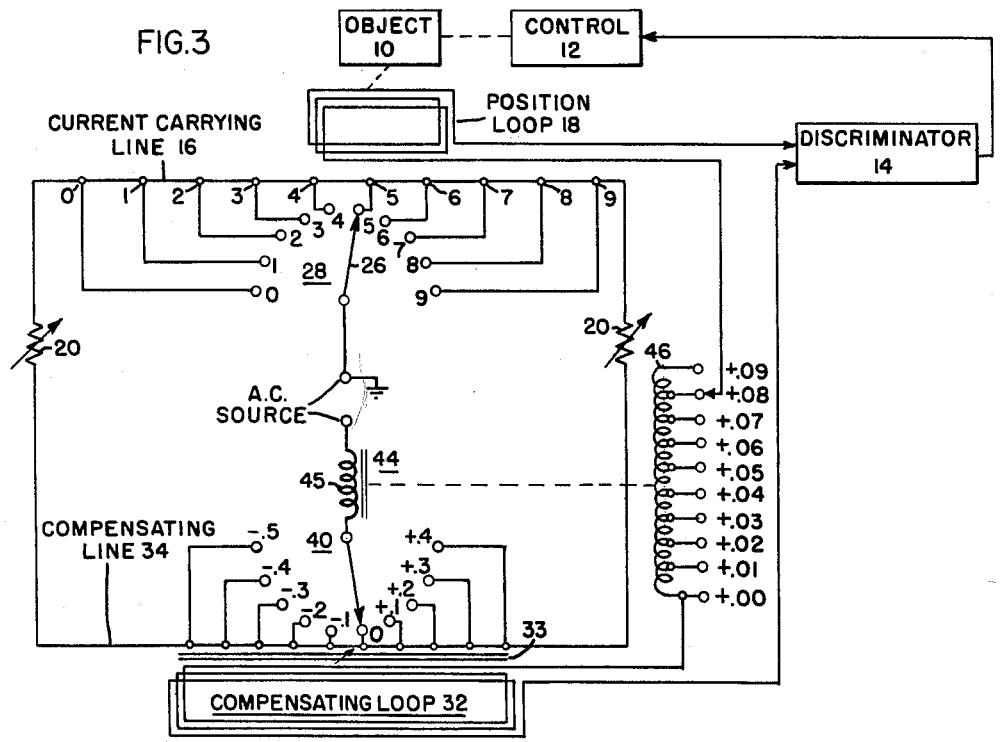
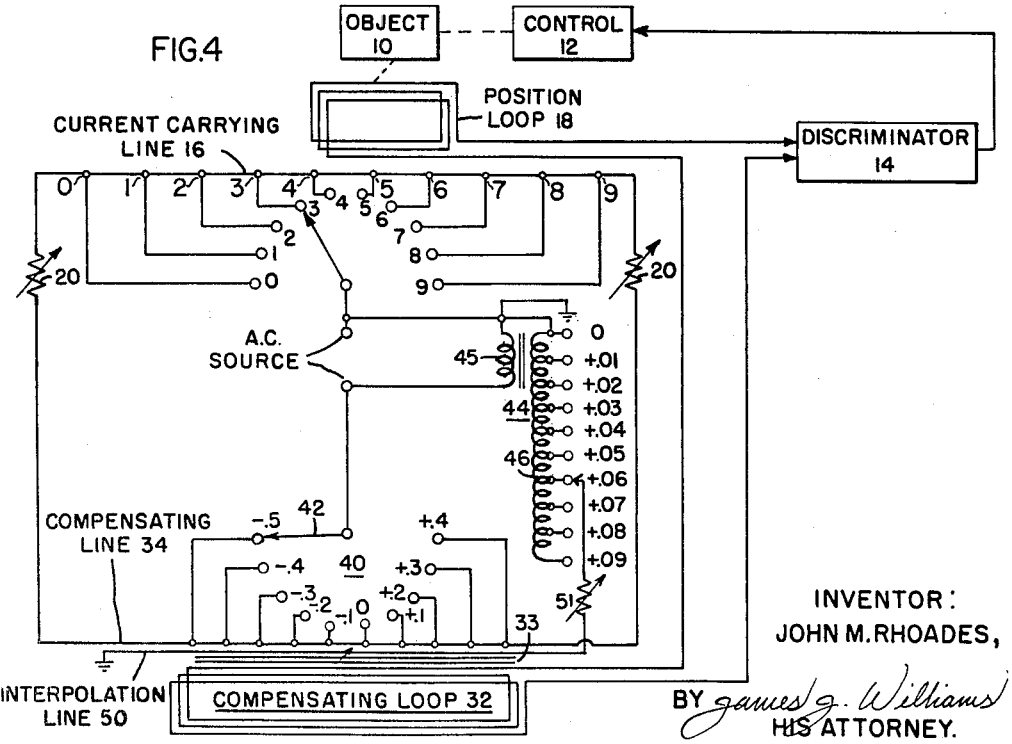
INVENTOR:
JOHN M. RHOADES,
BY James G. Williams
HIS ATTORNEY.

United States Patent Office 3,176,282
Patented Mar. 30, 1965

3,176,282
COMPENSATING CIRCUIT FOR POSITION
INDICATING DEVICE
John M. Rhoades, Waynesboro, Va., assignor to General
Electric Company, a corporation of New York
Filed Feb. 14, 1962, Ser. No. 173,235
7 Claims. (Cl. 340—196)

The invention relates to a compensating circuit, and particularly to a compensating circuit for reducing the effect of unequal currents in a position indicating device.

More particularly, the invention relates to a compensating circuit which is for use with and which is an improvement of the position indicating device described and claimed in a previous application entitled "Position Indicating Device," filed on May 31, 1960, in the names of Samuel C. Harris, Jr., and Lawrence W. Langley, Serial No. 32,700, now Patent No. 3,128,070, assigned to the same assignee of this application. As described in the previous application, the position indicating device comprises current carrying means which are adapted to be positioned on one of two objects, and current sensitive means which are adapted to be positioned on the other of two objects. In one embodiment of the invention described in the previous application, the current carrying means may take the form of an elongated wire positioned on the one object (usually the stationary object) along the path of relative motion of the two objects. The current carrying means are provided with means for enabling currents to flow in opposite directions between both ends and some selectable point between the ends, this selectable point being the location at which the second object (usually the movable object) is to be positioned relative to the first object. The current sensitive means may take the form of a simple loop and are adapted to be positioned on the second object. The current sensitive means should be located with respect to the current carrying means so as to be sensitive to currents therein. When so located, the current sensitive means will produce a signal in response to the current in the current carrying means. This signal has a characteristic and magnitude which are indicative of the position of the current sensitive means with relation to the selectable point on the current carrying means. This signal can be utilized by positioning systems to provide the desired relative motion. With such motion being provided, as the second object carrying the current sensitive means approaches the desired location (which is at a selected one of the selectable points between the ends of the current carrying means), the magnitude of the signal produced by the current sensitive means approaches a minimum. This signal approaches a minimum as the current sensitive means approaches the desired location because the opposite currents in the current carrying means both become effective. If the second object passes beyond the desired location, the signal produced will change its characteristic and will begin to increase in magnitude. Thus, the relative position of two objects can be indicated in accordance with the invention in a manner adaptable to many conditions and for many purposes.

While the position indicating device just described (and described in greater detail in the previous application mentioned) is satisfactory in many conditions, it does have one characteristic which may be undesirable. When the selectable point is midway between the ends of the current carrying means, the opposite currents in the current carrying means are substantially equal, and the signal produced by the current sensitive means becomes a minimum at substantially the selected point. However, when the selectable point is at some point other than the midpoint between the ends of the current carrying means, the impedances of the two ends differ and therefore the opposite currents are not equal. In this case, the minimum signal produced by the current sensitive means occurs when the current sensitive means is slightly displaced from the selected point. In many conditions, it is desirable or necessary that the position indicating device provide a signal which is actually a minimum or zero when the current sensitive means are precisely positioned at the selected point.

Therefore, an object of the invention is to provide a novel compensating circuit for use with a position indicating device as described herein and in the previous application mentioned.

Another object of the invention is to provide a novel compensating circuit for use with a position indicating device as described herein and in the previous application, the compensating circuit serving to provide substantially equal currents for any selected point on the current carrying means.

These and other objects are attained for the position indicating device in accordance with the invention by the provision of second current sensitive means in addition to the first current sensitive means of the position indicating device. The second current sensitive means are arranged to be responsive to any difference in the magnitudes of the currents in the current carrying means. The second current sensitive means produce a second signal which is indicative of this difference in magnitudes of the currents, and this second signal is combined with the first signal produced by the first current sensitive means of the position indicating device. The two signals are combined in a manner such that any effect of unequal currents on the first signal produced by the first current sensitive means is compensated for or substantially reduced to zero by the second signal produced by the second current sensitive means. In one embodiment, the second current sensitive means may be a transformer. In another embodiment, the second current sensitive means may be a loop such as utilized in the first current sensitipe means.

The invention will be better understood from the following description given in connection with the accompanying drawing, and its scope will be pointed out in the claims. In the drawing:

FIGURES 1 and 2 show circuit diagrams of two embodiments of the compensating circuit of the invention; and FIGURES 3 and 4 show circuit diagrams of two embodiments of the compensating circuit of the invention as utilized with interpolating means for the position indicating device.

In the four figures, the same reference numerals are used to refer to the same or corresponding parts. Each of the four figures shows the compensating circuit as used with the the position indicating device desscribed in the previous application mentioned. Further, each of the four figures shows the compensating circuit and position indicating device being used to control the movement of an object.

FIGURE 1 shows the position indicating device described in the previous application as used with a transformer in the compensating circuit of the invention. The position indicating device is provided to control the movement of an object 10, such an object being, for example, the worktable of a machine tool or a moving car or crane such as described in the previous application mentioned. While only one axis of movement for the object 10 is provided for in FIGURE 1 and the other figures, it is to be understood that other axes of movement may be similarly provided for. The object 10 is moved by suitable means contained in a control circuit 12. The control circuit 12 may comprise, as in known in the art, suitable circuits and a motor which cause the object 10 to move in accordance with a signal, usually direct current of either polarity, supplied by a discriminator 14. The control circuit 12 may be mechanically coupled to the object 10, this mechanical coupling being indicated by a dashed line in FIGURE 1. The discriminator 14 supplies its signal to the control circuit 12 as indicated by the single solid line. The discriminator 14 is provided with an input signal from the position indicating device. The arrangement including a position indicating device, the discriminator 14, and the control 12 for moving the object 10 is known in the art. Such an arrangement is shown in more detail in Patent No. 2,764,720 granted to L. U. C. Kelling on September 25, 1960. In the arrangement shown here in FIGURE 1, the discriminator 14 may comprise the discriminator 51 shown in the patent and the control 12 may comprise the motor control 3 and the motor 2 shown in the patent.

Although the position indicating device is described and claimed in detail in the previous application, a brief description of this position indicating device will first be given. This position indicating device includes a current carryng line 16 which is positioned along or in the vicinity of the path of motion of the object 10. Although the object 10 is herein considered to be movable, the object 10 may be stationary and the current carrying line 16 may be movable, or both the object 10 and the current carrying line 16 may be movable. A position loop 18 of any suitable form, such as rectangular and with or without a core, is provided on or carried by the object 10 as indicated by the dashed line between the object 10 and the position loop 18. The position loop 18 is arranged so that it retains a substantially constant orientation and space with respect to the current carrying line 16. A preferable orientation is with the position loop 18 and the current carrying line 16 lying in a common plane so that as strong a signal as possible will be produced by the position loop 18 in response to current in the current carrying line 16 as will be explained. The two ends of the current carrying line 16 are respectively coupled through adjustable balancing and limiting resistors 20 and through respective similar primary windings 23, 24 of a compensating transformer 22 to one side of an energizing source. This energizing source is preferably, but not necessarily, alternating current which has a frequency in the order of 1600 cycles per second. The other side of the energizing source is preferably coupled to a point of reference potential, such as ground, and to a movable switch arm 26 of a station or top selector 28. The movable arm 26 may be rotated to engage one of a plurality of numbered contacts which are respectively coupled to the current carrying line 16 at various numbered points or stations. In FIGURE 1, and the other figures, ten contacts and stations (0 to 9) are shown, although any number may be used. The exact locations of the numbered stations on the current carrying line 16 determine the positions which the position loop 18 and the object 10 may have. If the position loop 18 and the object 10 are to be positioned relative to the current carrying line 16 at station 9 for example, the movable arm 26 is rotated to engage the numbered contact 9. Current then flows along two paths including the common movable arm 26, the common connection from the numbered contact 9 to station 9, both portions of the current carrying line 16 on either side of station 9, both of the resistors 20, both of the primary windings 23, 24, and the common connection between these windings 23, 24. The current through the common portions of these two paths has been designated $I_O$, and the currents through the two separate paths have been designated $I_L$ and $I_R$ respectively. The sum of the two currents $I_L$ and $I_R$ is equal to the current $I_O$. If the energizing source is alternating current, then current flows through the two paths just described in both direcions. For purposes of explanation, it is assumed that the energizing source is in that part of the cycle where the upper or grounded terminal of the energizing source is positive with respect to the lower terminal of the energizing source. The current $I_O$ then flows in the manner indiciated by its arrow, and the two currents $I_L$ and $I_R$ flow in the manner indicated by their respective arrows. If the energizing source is an alternating current potential, the two current $I_L$ and $I_R$ induce respective signals or voltages in the position loop 18. These two signals or voltages appear at the loop output terminals as a single resultant loop signal which is the vector sum of the two induced signals. This loop signal is coupled to the discriminator 14. Actually, the loop signal is coupled through a secondary winding 25 of the compensating transformer 22, but this will be ignored for the moment. If the position loop 18 is located at a point to the left of station 9, a loop signal is produced which is predominated by the current $I_L$. This loop signal is coupled to the discriminator 14 to effect movement or control of the object 10 and the loop 18 to the right or toward station 9. As the object 10 and the loop 18 approach station 9, the current $I_R$ begins to have more effect on the loop signal. When the loop 18 is substantially centered with respect to station 9, the effects of the two currents $I_L$ and $I_R$ are very nearly equal. Since these two currents $I_L$ and $I_R$ flow in opposite directions, they have opposite effects so that the loop signal is at a null or low value. By appropriate circuit design, when the loop signal falls below some predetermined value, the discriminator 14 and the control circuit 12 may be rendered insensitive so that further positioning is stopped. If the loop 18 and object 10 are located to the right of the selected station 9, then the loop signal is predominated by the current $I_R$ to effect positioning to the left. It will thus be seen that when the object 10 and the position loop 18 are at some position other than a selected station, the loop signal effects positioning toward that station.

The balancing and limiting resistors 20 are provided to balance and to limit the currents. These resistors 20 are preferably adjusted with the movable arm 26 engaging the centermost numbered contact, in this case either the numbered contact 4 or the numbered contact 5. With the movable arm 26 engaging either of these contacts 4 or 5, and with the energizing source being supplied, the resistors 20 are adjusted so that the two currents $I_L$ and $I_R$ are equal and have the desired magnitude. With this adjustment made, it will be seen that when the movable arm 26 engages any other numbered contacts, such as the extreme numbered contacts 0 or 9, the currents $I_L$ and $I_R$ will differ in magnitude. This is because different lengths of the current carrying line 16, and hence unequal impedances, are provided for the two currents $I_L$ and $I_R$. If the movable arm 26 engages the numbered contact 0, the path for the current $I_R$ has a greaer impedance and therefore the current $I_R$ has less magnitude than the current $I_L$. Conversely, if the movable arm 26 engages the numbered contact 9, the path for the current $I_L$ has a greater impedance and therefore the current $I_L$ has less magnitude than the current $I_R$. Since the currents may have unequal magnitudes, the resultant loop 18 signal reflects these unequal magnitudes. When the position loop 18 is physically and electrically centered at or with respect to a selected station, the two currents $I_R$ and $I_L$ may have unequal effects. Thus the resultant or loop signal may be predominated to some degree by one of the two currents. In the example of selected station 9, the current $I_R$ is slightly greater in magnitude than the current $I_L$. The loop signal is predominated by this current $I_R$ so that positioning would be toward the left. As positioning is effected to the left, a point is reached where the two currents $I_R$ and $I_L$ have equal effects and positioning is stopped. Therefore, final positioning is displaced from or is at some point slightly to the left of the selected station, in the example station 9. In a similar manner, final positioning for the other stations would be slightly to the left of stations 6, 7, 8, and slightly to the right of stations 0, 1, 2, and 3. Further, each of the final positions would be at varying displacements from the stations because of the varying difference in magnitudes of the two currents $I_R$ and $I_L$ for each selected station.

Since these final positions are so displaced, and are so displaced by varying amounts, it is desirable to compensate for the unequal current magnitudes so that the position loop 18 produces a null signal at the same point relative to each of the selected stations. As shown in FIGURE 1, this is attained in accordance with the invention by means of the compensating transformer 22. The compensating transformer 22 includes the two similar primary windings 23, 24 which are suitably coupled through an adjustable core 29 to a secondary winding 25. The relative polarities of the windings 23, 24, 25 are indicated by the polarity dots. It will be seen that the currents $I_R$ and $I_L$ (which are in opposite directions) through the respective primary windings 23, 24 have opposite effects on the secondary winding 25. Thus the secondary winding 25 provides a signal in response to the currents $I_R$ and $I_L$ which is indicative of the relative magnitudes of the currents $I_R$ and $I_L$. The secondary winding 25 is coupled in series with the position loop 18 so that the signals from the secondary winding 25 and the loop 18 are serially combined and are coupled to the discriminator 14. These signals are serially combined in opposition or in reverse so that if, at any one instant, the loop signal provides one polarity to the discriminator 14, the secondary winding signal provides the opposite polarity to the discriminator 14. The core 29 is adjusted so that the signal as provided by the secondary winding 25 is equal to only that portion of the loop signal which results from a difference in magnitudes of the currents $I_L$ and $I_R$. This adjustment may be made after adjustment of the resistors 20 as already described, and with the position loop 18 centered, from a mechanical or electrical standpoint as desired, at either of the extreme stations, such as station 0 or station 9. The movable arm 26 is engaged with the corresponding numbered contacts 0 or 9. The core 29 is then adjusted so that the two combined signals from the loop 18 and the secondary winding 25 total or result in a very low minimum signal or zero signal applied to the discriminator 14.

With such an adjustment of the compensating circuit in accordance with the invention having been made, a minimum or zero signal will be applied to the discriminator 14 when the position loop is centered at any of the numbered stations. The following numerical example will illustrate this. Assume that the position loop 18 is centered at station 9. Also assume that the current $I_R$ has a magnitude of 1.10 amperes and that the current $I_L$ has a magnitude of 0.98 ampere. The difference in magnitudes of these two currents is 0.12 ampere which results in a net current effect of 0.12 ampere flowing to the right as far as the position loop 18 is concerned. A typical position loop 18 might produce an output voltage of approximately 5.0 volts in response to this difference current of 0.12 ampere. Assume at a given instant that the currents $I_R$ and $I_L$ are flowing in the directions indicated by the arrows and that the ouput voltage of 5.0 volts responsive to the current difference of 0.12 ampere is of a polarity such that the upper input terminal coupled to the discriminator 14 is positive with respect to the lower input terminal coupled to the discriminator 14. In the same example, and with regard to the compensating transformer 22, the same currents $I_R$ and $I_L$ are respectively flowing through the primary windings 24, 23. The difference in magnitudes of these currents $I_R$ and $I_L$ is still 0.12 ampere and this induces some net voltage across the secondary winding 25. This voltage across the secondary winding 25 is adjusted by the adjustable core 29 so that a voltage of 5.0 volts is provided by the secondary winding 25 to the input terminals of the discriminator 14. At the same instant when the voltage from the position loop 18 has a polarity such that the upper input terminal of the discriminator 14 is positive relative to the lower input terminal, the voltage or signal from the secondary winding 25 has a polarity such that the upper input terminal of the discriminator 14 is negative with respect to the lower input terminal. It will thus be seen that a net voltage of zero is applied to or across the input terminals of the discriminator 14. In this way, the compensating circuit of the invention provides a minimum null signal or a zero null signal when the position loop 18 is centered at any selected station. This results from the fact that any difference in current magnitudes which affect the loop signal also affect the signal provided by the compensating transformer 22 to the same degree but in an opposite sense or polarity.

FIGURE 2 shows another embodiment of the compensating circuit in accordance with the invention. The arrangement and operation of the circuit shown in FIGURE 2 is substantially the same as the circuit shown in FIGURE 1. The only difference is that the compensating transformer 22 has been replaced by a compensating loop 32 which is coupled to a compensating line 34 by an adjustable core 33 as shown. The use of a compensating loop 32 in place of a compensating transformer 22 as shown in FIGURE 1 has several advantages. First, such a loop may be simpler and less expensive than a transformer. Second, such a loop may provide better impedance matching than a transformer, particularly since it is coupled to the position loop 18. The compensating loop 32 is positioned and the core 33 adjusted with respect to the compensating line 34 so that the signal produced by the compensating loop 32 is equal to the signal produced by the position loop 18. The two loops 18, 32 are coupled in series as described in connection with FIGURE 1 so that their polarities at any instant are reversed or oppose one another. In this way, the same compensating effect is provided with additional advantages, such as those mentioned.

FIGURE 3 shows another embodiment of the compensating circuit of the invention as used with a position indicating device described in the previous application, the position indicating device being provided with interpolation signals which enable positioning to be attained between selected stations. In FIGURE 3, it has been assumed that the position indicating device is to effect or provide positioning at any point between the numbered stations 0 through 9 to within one one-hundredth the distance between such stations. Greater or less resolution may be provided. For simplification, it is assumed that the numbered stations are precisely positioned at one inch intervals along the current carrying line 16. Thus, the position indicating device can effect positioning to within one hundredth of an inch between such stations. The positioning between stations is described in the previous application mentioned, but will be described briefly again. A one-tenth inch interpolation selector 40 having a movable arm 42 and a plurality of numbered contacts is provided. The numbered contacts of the interpolation selector 40 are coupled to the compensating line 34 at equally spaced intervals with the numbered contact 0 being connected to the center of the compensating line 34. Since there are ten of these numbered contacts, four contacts labeled +.1 through +.4 are positioned to the right of the numbered contact 0, and five contacts labeled —.1 through —.5 are positioned to the left of the numbered contact 0. The movable arm 42 is coupled through the primary winding 45 of a one-hundredth inch interpolation transformer 44 to the energizing source as shown. A secondary winding 46 is coupled to the primary winding 45, this secondary winding 46 being provided with ten equal voltage taps as indicated. These voltage taps, along with the appropriate impedance ratio of the interpolation transformer 44, provide interpolation signals corresponding to one hundredth of an inch. The compensating loop 32 may be adjustably coupled to the compensating line 34 over the spacing or span of the stations associated with the one-tenth inch interpolation selector 40. The compensating loop 32 is coupled in series with the position loop 18 and the secondary winding 46, and this series circuit is coupled to the input terminals of the discriminator 14. The numbered taps associated with the interpolation selector 40 and the secondary winding 46 serve to change the relative magnitudes of the currents $I_R$ and $I_L$ or the effect of the currents $I_R$ and $I_L$ and thus provide interpolation between the one inch stations.

In FIGURE 3, the movable elements have been positioned to correspond to a desired position of 5.08 inches. Thus, no modification or interpolation is provided by the interpolation selector 40 but a slight interpolation, namely .08 inch, is provided by the secondary winding 46. Positioning at other intermediate points on each side of the numbered stations is achieved by appropriate movement of the movable arm 42 and selection of an appropriate tap on the secondary winding 46. It will thus be seen that positioning may be attained over a total range from −0.50 inch to +9.49 inches. The compensating loop 32 of FIGURE 3 actually performs a dual function in that it supplies an interpolation signal provided by the interpolation selector 40 as well as provides a compensating signal as described in FIGURES 1 and 2. Again, this compensating signal is equal and opposite in polarity with respect to the signal from the position loop 18 which results only from differences in magnitudes of the currents $I_R$ and $I_L$ without any interpolation.

FIGURE 4 shows the compensating circuit of the invention used with still another arrangement of the position indicating device. The circuit of FIGURE 4 is again intended to provide interpolation to within one one-hundredth the distance between selected stations. However, instead of coupling the secondary winding 46 in series with the compensating loop 32 as shown in FIGURE 3, the tap associated with the secondary winding 46 is coupled to an interpolation line 50 through an adjustable resistor 51. The interpolation line 50 and the compensating line 34 are both coupled to the compensating loop 32 so that both their signals affect the output signal from the compensating loop 32. Thus, in FIGURE 4, only the compensating loop 32 is serially coupled to the position loop 18, this resulting in the advantages mentioned in connection with FIGURE 2. FIGURE 4 provides the same total range, namely from −0.50 inch to +9.49 inches. The movable elements of FIGURE 4 have been set to effect positioning at 2.57 inches.

It will thus be seen that the compensating circuit of the invention provides improved operation for various embodiments of the position indicating device described herein and in the previous application. And although the compensating circuit has been shown in only a few embodiments of the position indicating device, the compensating circuit can be used with other modifications or embodiments of the position indicating device both with and without various interpolation embodiments. One particular modification might be mentioned. In the figures, the circuits for the loop signal and the compensating signal may be electrically connected in parallel rather than in series as long as the reverse polarity condition is maintained. In either the series or the parallel circuit, an appropriate ground or reference potential connection may be provided. Since such circuits and connections are apparent to persons skilled in the art, they have not been shown. Such uses, modifications, and embodiments will be apparent to persons skilled in the art and come within the spirit and scope of the invention. Thus it is to be understood that modifications may be made without departing from the spirit of the invention or from the scope of the claims.

What I claim as new and desire to secure by Letters Patent of the United States is:

1. A device for indicating the position of two objects with relation to each other comprising current carrying means adapted to be associated with one of said objects, said current carrying means having a common current path which branches into two main current paths, first current sensitive means adapted to be associated with the other of said objects for producing a first signal in response to the current through said two main current paths of said current carrying means, said first signal having a magnitude and characteristic indicative of the relative position of said current carrying means and said current sensitive means, second current sensitive means for producing a second signal in response to the difference in currents in said two main current paths of said current carrying means, and means coupling said second signal to said first signal.

2. A device for indicating the position of two objects with relation to each other comprising current carrying means adapted to be associated with one of said objects, said current carrying means having a common current path which branches into two main current paths, first current sensitive means adapted to be associated with the other of said objects for producing a first signal in response to the current through said two main current paths of said current carrying means, said first signal having a magnitude and characteristic indicative of the relative position of said current carrying means and said current sensitive means, second current sensitive means for producing a second signal in response to the difference in currents through said two main current paths of said current carrying means, and means coupling said second signal to said first signal in polarity opposition.

3. A device for indicating the relative position of two objects comprising an elongated current carrying line adapted to be fastened to one of said objects, said current carrying line having a plurality of paths coupled thereto intermediate the ends thereof, first means for selecting one of said paths and causing current to flow between said one selected path and said ends of said current carrying line, second means adapted to be fastened to the other of said objects for producing a first signal in response to said currents in said current carrying line, said first signal having a magnitude and polarity indicative of the relative position of said one selected path and said second means, third means for producing a second signal in response to the difference in said currents in said current carrying line, and means coupling said second signal to said first signal in polarity opposition.

4. A device for indicating the relative position of two objects comprising an elongated current carrying line adapted to be fastened to one of said objects, said current carrying line having a plurality of paths coupled thereto intermediate the ends thereof, first means for selecting one of said paths and causing currents to flow between said one selected path and in opposite directions between said ends of said current carrying line, second means adapted to be fastened to the other of said objects for producing a first signal in response to said currents in said current carrying line, said first signal having a magnitude and polarity indicative of the relative position of said one selected path and said second means, third means for producing a second signal in response to said currents in said current carrying line, said second signal having a magnitude and polarity indicative of the relative magnitudes of said currents in said current carrying line, and means coupling said second signal to said first signal in polarity opposition.

5. A device for indicating the relative position of two objects comprising an elongated current conducting line adapted to be positioned on one of said objects in the vicinity of the path of relative motion of said objects, said current conducting line having a plurality of taps coupled thereto at points intermediate the ends of said current conducting line, first means coupled to said ends of said current conducting line and a selected one of said taps to enable a current to flow between said selected one of said taps and both of said ends of said current conducting line, first current sensitive means adapted to be fastened to the other of said objects for producing a first signal in response to currents in said current conducting line, said first signal having a characteristic indicative of the location of said first current sensitive means with respect to said selected tap and said ends of said current conducting line and having a magnitude indicative of the distance between said current sensitive means and said selected tap, second current sensitive means for producing a second signal indicative of the relative magnitudes of currents in said ends of said current conducting line, and means coupled to said first and said second current sensitive means for combining said first and second signals in a manner which tends to reduce the effect of a difference in said relative magnitudes of currents in said ends of said current carrying line.

6. A device for indicating the relative position of two objects comprising an elongated current conducting line adapted to be positioned on one of said objects in the vicinity of the path of relative motion of said objects, said current conducting line having a plurality of taps coupled thereto at points intermediate the ends of said current conducting line, first means coupled to said ends of said current conducting line and a selected one of said taps to enable a current to flow between said selected one of said taps and both of said ends of said current conducting line, first current sensitive means adapted to be fastened to the other of said objects for producing a first signal in response to currents in said current conducting line, said first signal having a characteristic indicative of the location of said first current sensitive means with respect to said selected tap and said ends of said current conducting line and having a magnitude indicative of the distance between said current sensitive means and said selected tap, transformer means coupled to said first means for producing a second signal indicative of the relative magnitudes of currents in said ends of said current conducting line, and means coupled to said first current sensitive means and to said transformer means for combining said first and second signals in polarity opposition to reduce the effect of a difference in said relative magnitudes of currents in said ends of said current carrying line.

7. A device for indicating the relative position of two objects comprising an elongated current conducting line adapted to be positioned on one of said objects in the vicinity of the path of relative motion of said objects, said current conducting line having a plurality of taps coupled thereto at points intermediate the ends of said current conducting line, first means coupled to said ends of said current conducting line and a selected one of said taps to enable a current to flow between said selected one of said taps and both of said ends of said current conducting line, first current sensitive loop means adapted to be fastened to the other of said objects for producing a first signal in response to currents in said current conducting line, said first signal having a characteristic indicative of the location of said first current sensitive means with respect to said selected tap and said ends of said current conducting line and having a magnitude indicative of the distance between said current sensitive means and said selected tap, second current sensitive loop means coupled to said first means for producing a second signal indicative of the relative magnitudes of currents in said ends of said current conducting line, and means coupled to said first and said second current sensitive loop means for combining said first and second signals in polarity opposition to reduce the effect of a difference in said relative magnitudes of currents in said ends of said current carrying line.

References Cited by the Examiner

UNITED STATES PATENTS 2,781,488 2/57 Zimmerman et al. ____ 324—34 X
2,962,652 11/60 Bulliet et al. _____ 323—53

OTHER REFERENCES

"Control-Engineering," published by McGraw-Hill, January 1958, pages 88–91.

EUGENE G. BOTZ, *Primary Examiner*.

LEO QUACKENBUSH, *Examiner*.